United States Patent [19]
Norgren

[11] 3,785,021
[45] Jan. 15, 1974

[54] THIN CHIP CUTTING TOOL
[75] Inventor: Lars Erik Norgren, Sandviken, Sweden
[73] Assignee: Sandvik Aktiebolag, Sandviken, Sweden
[22] Filed: Feb. 18, 1972
[21] Appl. No.: 227,422

[30] Foreign Application Priority Data
Mar. 1, 1971 Sweden.............................. 2547/71

[52] U.S. Cl...................................... 29/96, 83/845
[51] Int. Cl............................................. B26d 1/00
[58] Field of Search ................... 29/96; 83/845, 840

[56] References Cited
UNITED STATES PATENTS
383,103 5/1888 Cook ............................... 83/845 X
2,922,219 1/1960 Scott...................................... 29/96
2,828,529 4/1958 Bryant .................................. 29/96
246,703 9/1881 Atkins................................... 83/845

Primary Examiner—Leonidas Vlachos
Attorney—Ralph E. Parker et al.

[57] ABSTRACT

A thin cutting tool comprises a plate-shaped holder having an insert site and an insert secured in said insert site by means of a somewhat resilient clamping arm. One end of the clamping arm is fixed to the holder whilst with its free other end it clamps the insert in the insert site. The clamping force is supplied by bending the clamping arm. Preferably, the clamping arm is tapered from its fixed end to its opposite or free end, with a gradient selected to provide a substantially constant bending stress.

2 Claims, 4 Drawing Figures

THIN CHIP CUTTING TOOL

The present invention relates to thin chip cutting tools as parting tools, groove cutting tools, saws and similar tools adapted to cut thin slots in work pieces, especially of metal, either in order to cut off a piece or to make a groove. Such tools conventionally comprise a thin, plate-shaped holder and an insert brazed therein. Brazed inserts have the disadvantage that they are difficult to replace when they are worn out. Conventional clamping means for replaceable inserts cannot be used, because the holder is so thin that there is no room for a clamping mechanism.

It is an object of the present invention to make it possible to use clamping also in these thin tools. For this purpose the holder is provided with a resilient clamping arm one end of which is fixed in the holder and with its other end it clamps an insert by a clamping force resulting from bending the clamping arm. This arm is operated by means separate from the holder, and thus the need for a clamping mechanism on the holder is eliminated.

The invention will now be further disclosed and illustrated in the following specification, taken with the accompanying drawing wherein.

Figure 1:
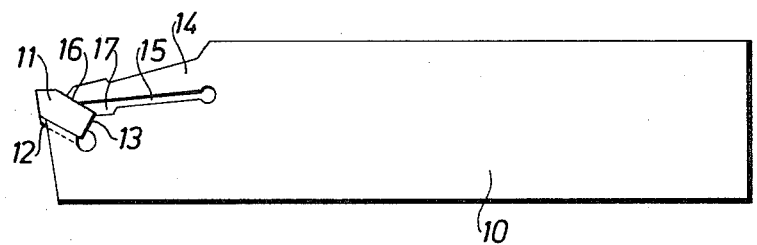
FIG. 1 is a side view of a parting tool according to the invention.
Figure 2:
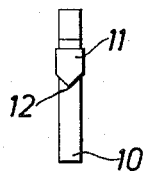
FIG. 2 is an end view of the same tool.

The parting tool in FIG. 1 consists of a holder shaft 10 and a cutting insert 11 mounted therein. The shaft, is shaped as a thin plate, the insert being somewhat thicker and projecting on both sides of the shaft, so that the shaft can enter into the slot that is cut by the insert. The insert is suitably made of sintered carbide and the holder shaft of steel.

The usual width of the insert is a parting tool or a saw is 3 to 6 mm. The holder can for instance be 0.6 mm thinner, the insert thus projecting 0.3 on both sides. In a groove cutting tool the insert can be up to 12 mm wide.

The insert is mounted in an insert site having a bottom surface 12 and a rear support surface 13. The top of the insert site is formed by a surface 16 on a clamping arm 14 formed in one piece with the shaft by cutting a slit 15 therein. Alternatively the arm can be made separately and fixed to the holder by welding or riveting.

The height of the arm 14 is so small that the arm can be bent resiliently in the plane of the shaft. When there is no insert in the site the spacing between the surfaces 12 and 16 is smaller than the height of the insert. For mounting the insert these surfaces must thus be forced apart by bending the arm 14 away from surface 12, whereafter the insert is placed in the site and the arm 14 is permitted to spring back into abutment with the insert thus holding it with the resilient force resulting from the bending of the arm.

Figure 3:
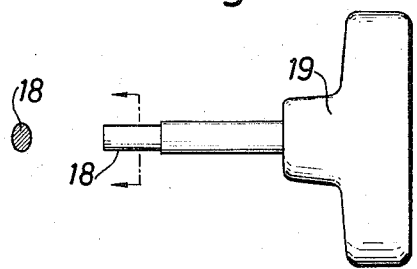
FIG. 3 shows a key for operating the clamping arm in the tool.

In order to bend the arm in the way described, the slit 15 has a wider portion 17 and there is provided a key 19 -- see FIG. 3 -- with an elliptic shaft portion 18 having one diameter smaller and the other diameter greater than the width of the slit portion 17. By inserting the shaft portion 18 in the slit portion 17 and turning the handle a quarter of a turn the arm 14 is bent away from the surface 12.

The bottom surfaces of the insert and the site have matching V-shape in order better to secure the insert in the site. The other surfaces of the site can be shaped in the same way. Also, other shapes can be used for the same purpose.

The bottom surface 12 is inclined upwardly in relation to the cutting pressure in order that the insert is urged into the site. The top surface 16 is similarly inclined, and is either parallel with the surface 12 or approaches it somewhat in the direction away from the rear support 13. If the insert is five-sided, as in FIG. 1, the clamping arm 14 comes below the chip flow from the cutting tip.

The height of the arm 14 tapers from the fixed to the free end, and the taper preferably should have such a gradient that the stresses, when the arm is bent, are equal along the arm. This has the advantage that maximal clamping force is obtained for a certain deflection of the arm, thus rendering the slit as short as possible and the holder as rigid as possible.

Figure 4:
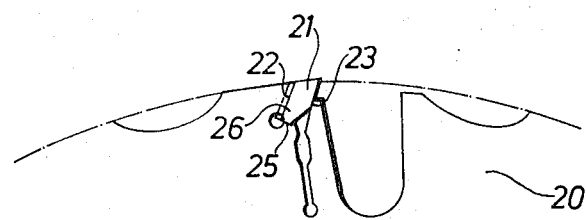
FIG. 4 is a side view of a tooth in a circular saw according to the invention.

In FIG. 4 there is shown a circular saw having a number of cutting inserts 21 spaced around the periphery. Only one of the inserts is illustrated. Insert 21 is clamped in substantially the same way as insert 11 in FIG. 1. The insert site has a bottom surface 22 and a top surface 23 on a resilient arm. The surfaces 22 and 23 converge somewhat outwardly in order to counteract the centrifugal force. The inner portion 26 of the insert abuts a rear support surface 25, and both have in side view a V-shape in order to prevent the cutting force from turning the insert over around the peripheral end of the support surface 22.

I claim:

1. Thin chip-cutting tool comprising;
   a plate-shaped holder; an insert site in said holder comprising a top surface, a bottom surface and a rear support surface;
   a cutting insert located in said site and projecting on each side of the holder; and
   a clamping arm integral with the holder having one end fixed in the holder and its free other end clamping said insert in said insert site with a pressure resulting from spring-back of the clamping arm,
   the clamping arm having a portion extending between the insert and the fixed end of the arm, said portion tapering with such a gradient that the bending stresses in the arm are approximately constant and provide a maximum deflection of the clamping arm in relation to the clamping pressure from the spring-back.

2. The chip-cutting tool defined in claim 1, according to which said tapering portion of the clamping arm is spaced apart from the holder by a slit which accommodates a key having an elliptical portion the long axis of which ellipse has a somewhat greater length than is the width of the slit when the clamping arm is unflexed.

* * * * *